United States Patent [19]

Messenger

[11] Patent Number: 4,579,668

[45] Date of Patent: Apr. 1, 1986

[54] WELL SERVICING AGENTS AND PROCESSES

[75] Inventor: Joseph U. Messenger, Dallas, Tex.

[73] Assignee: The Western Company of North America, Forth Worth, Tex.

[21] Appl. No.: 499,117

[22] Filed: May 27, 1983

[51] Int. Cl.$^4$ .......................... C09K 7/00; E21B 7/18
[52] U.S. Cl. ............................... 252/8.5 LC; 175/72; 166/294
[58] Field of Search .......... 252/8.5 A, 8.5 P, 8.5 LC; 175/72; 166/294

[56] References Cited

U.S. PATENT DOCUMENTS

| | | | |
|---|---|---|---|
| 2,793,995 | 5/1957 | Twining | 252/8.5 LC |
| 2,894,906 | 7/1959 | Sheeler | 252/8.5 LC |
| 2,912,380 | 11/1959 | Deane | 252/8.5 LC |
| 3,375,888 | 4/1968 | Lummus | 175/72 |
| 3,433,740 | 3/1969 | Armentrout | 175/72 |
| 3,629,102 | 12/1971 | Lummus | 175/72 |
| 3,979,305 | 9/1976 | Fisher et al. | 252/8.516 |

FOREIGN PATENT DOCUMENTS 722575  11/1965  Canada ................................. 175/72

OTHER PUBLICATIONS

"Some Affects of Size Distribut on Particle Bridging in Lost Circulation Filtration Test" Gatlin et al.—Journal of Petroleum Tech. pp. 576–578.

Messenge J. U. "Lost Circulation" Pennwall Pub. Co. Tulsa, Okla. 1981 pp. 23–38 & 97–99.

*Primary Examiner*—Theodore Morris
*Attorney, Agent, or Firm*—Richards, Harris, Medlock & Andrews

[57] ABSTRACT

Well servicing agents and processes for use with fluids circulated into wells penetrating subterranean formations in the earth's crust. Circulation losses of well servicing fluids including drilling muds, workover and completion fluids, and the like, are alleviated by incorporating a particulate material into the servicing liquid. The particulate material is formed of a thermoplastic polymer in a flexible, elongated laminar form in which its length is substantially greater than its width and its width substantially greater than its thickness. A second particulate material in a rigid granular form may be employed an admixture with the laminar particulate material. A particular lost circulation agent is a blend of a particulate thermoplastic polymer in a flexible, elongated form and a particulate thermoset polymer in a rigid granular form with the ratio of the laminar material to the granular material being at least 1:6.

15 Claims, No Drawings

WELL SERVICING AGENTS AND PROCESSES

TECHNICAL FIELD

This invention relates to the drilling, cementing, completing and servicing of wells in the earth's crust and more particularly to well additives and their use in the drilling, cementing, completing and servicing of wells.

BACKGROUND OF THE INVENTION

Wells are extended into the earth's crust to desired subterranean locations, e.g., oil and/or gas bearing formations, through the applicaton of rotary drilling techniques. In the rotary drilling of a well, a drilling fluid is circulated through the well in order to remove cuttings from the bottom of the well. Typically, this is accomplished by pumping the drilling fluid downwardly through a drill string within the well and then upwardly to the surface of the well through the annulus surrounding the drill string. The drill cuttings are entrained in the drilling fluid and brought to the surface with the fluid and then screened out and discarded. In addition to removing cuttings, the drilling fluid also serves to cool and lubricate the drill bit and, in the case of systems employing downhole drill motors, it functions as a power fluid for the drill motor.

While in some cases gaseous drilling fluids may be employed, most rotary drilling techniques employ a liquid medium, termed a "drilling mud", which has various solids dissolved or suspended therein. The drilling mud may comprise either an aqueous-base mud or an oil-base mud. The liquid medium employed in an oil base drilling mud may be a relatively pure oil such as crude petroleum oil or diesel oil, or it may be an "invert" emulsion, a water-in-oil emulsion in which oil forms the continuous phase. Such oil-base drilling muds may be used to advantage where the formation being drilling is a suspected oil or gas producing zone or where shale formations which are unstable to water are encountered. In water-base drilling muds, the liquid medium employed typically is fresh water, salt water or an oil-in water-emulsion in which water forms the continuous phase.

Both water-base and oil-base drilling muds normally contain clays and/or other dispersed solids which are employed to impart desired rheological properties to the mud. The suspended solids employed in water-base drilling muds typically take the form of clays of the montmorillonite or illite groups. These clays are utilized to impart desirable thixotropic properties to the drilling mud and also serve to coat the walls of the well with a relatively impermeable sheath, commonly termed a filter cake, which retards the flow of fluid from the well into the surrounding subterranean formations. Exemplary of the clays which may be employed in water base drilling muds is bentonite, which is montmorillonite-type clay. The bentonite is dispersed within the aqueous base liquid as colloidal particles and imparts the desired degree of thixotropy. Clays such as those discribed above which have been rendered oleophilic by suitable treatment may be used in oil base drilling fluid. For example, the "bentones" which are formed by treating bentonites with long chain amines are widely used in oil base drilling muds to impart desirable rheological properties. Other materials which may be used for this purpose in oil-base drilling fluids include oxidized tall oil, lampblack and blown asphalt. In addition to the various colloidal materials such as mentioned above, a drilling fluid may also contain one or more weighting agents which function to increase the density of the fluid to a level which will offset high pressures encountered during the drilling operation. Examples of weighting agents which may be used in either water base or oil base drilling muds are heavy minerals such as barite and gelena.

One frequently encountered difficulty in drilling operations is the problem of lost returns in which part or all of the whole drilling fluid is not returned to the surface. The problem may range from only moderate losses of fluid to a total loss of drilling fluid such that none of it is returned to the surface. Where a formation or thief zone is identified in which unacceptably large amounts of drilling fluid is lost, such formation is commonly termed a "loss zone" or a "loss circulation zone". Loss circulation may occur when the well encounters a formation of unusually high permeability or one which has naturally occurring horizontal or verticle fractures or fissures. Also the formation may be fractured accidentally by the hydrostatic pressure exerted by the drilling mud, particularly when a change over to a relatively heavy mud is made in order to control high formation pressures.

Numerous techniques have been developed in order to control loss circulation. One common expedient where the loss circulation is not severe is to add various fluid loss agents which function to change the rheological properties of the drilling mud in order to increase its resistence to flow from the well bore into the formation. Such fluid loss agents include synthetic polymeric thickening agents such as partially hydrolyzed polyacrylamide or a polyelectrolite such as the ionic polysaccharide B-1459, available under the trade name "Kelzan". Other common naturally occurring fluid loss agents include various gums such as locust bean gum and guar gum, various starches, and carboxymethylcellulose (CMC) or carboxyethylcellulose (CEC).

Where the loss circulation is more severe, it is a normal practice to incorporate into the drilling mud various bulk materials which function as bridging agents. The use of bridging agents is described by Messenger, J. U. "Loss Circulation", Pen Well Publishing Company, Tulsa, Okla. 1981, particularly Chapter 4, and as there noted, they may be characterized as granular, fibrous, and laminated (flakes). Examples of granular materials are ground walnut shells and plastics, ground coal, gilsonite, neoprene, limestone, sulfur, ground fruit pits and expanded perlite. Fibrous materials include sawdust, prairie hay, bark, sugar cane fiber, shredded wood, leather, asbestos and cottonseed hulls. Laminar materials or flakes include wood shavings, cellophane and mica. As disclosed by Messenger at pages 28 and 29, a two-component blend of a granular bridging agent such as sawdust and a fibrous agent such as leather flock is more effective than either agent alone. Also, as further disclosed by Messenger at page 32, a suitable three component mixture comprises 1-6 parts granular agent, 2 parts of coarse-to-fine fiber agent, and 1 part of a flake agent. At page 38, the author discloses an oil-mud additive comprising three parts granular, two parts fiber and one part flake.

In addition to the use of particulate bridging agents, various other procedures may be employed in order to control lost circulation. Such procedures may be used in conjunction with bridging agents or separately thereof. For example, hydraulic cement slurries may be introduced into the loss circulation zone to form a hard plug. A diesel-oil-bentonite slurry may be circulated into or adjacent the loss circulation zone and hydrated to form a "soft plug" which plugs the fracture or other loss zone. Also, a diesel-oil-bentonite slurries containing a hydratable cement such as portland cement may be employed to form a plug which is initially highly gelled but which then sets to form a hard plug. As noted previously, such hard plugs or soft plugs may be employed alone or in conjunction with particulate bridging agents.

At the conclusion of the drilling procedure, a changeover often is made from the drilling mud to a completion fluid which is maintained in the hole during the final steps of drilling and completing the well. For example, when the productive formation is encountered, it is conventional practice to halt drilling, set and cement casing, and then continue to drill into the producing zone. During this final drilling procedure, a relatively clean oil base or water base liquid is maintained in the hole in order to offset the downhole pressures encountered. Such completion fluids may also be employed in the course of other operations conducted at the conclusion of the drilling procedures such as circulating in gravel suspensions to form a "gravel pack" at the bottom of the well.

After a well is completed and placed on production, it is often necessary to interrupt the normal operation of the well to carry out various well servicing or workover operations with a "workover fluid" present in the well. The workover fluid, like the well completion fluid, may be an oil-base or a water-base liquid medium which is employed to maintain the necessary pressure at the bottom of the well without damaging the formation.

Many of the problems encountered in the circulation of a drilling mud during the normal drilling of the well may also be experienced when a well servicing fluid service such as a completion fluid or a workover fluid is circulated into the well. Accordingly, it is often times desirable to incorporate loss circulation or filter loss agents in well circulation fluids other than drilling muds.

DESCRIPTION OF THE INVENTION

In accordance with the present invention, there are provided a new and improved well servicing agents and processes of the type for use in conjunction with well circulation fluids such as a drilling muds, completion fluids, or workover fluids. In one aspect of the invention, there is provided a method of servicing a well penetrating a subterranean formation in the earth's crust. A well servicing liquid is circulated into the well and into contact with the formation. In order to alleviate circulation loss of the fluid in the formation, a particulate material is incorporated into the servicing liquid. The particulate material is formed of a thermoplastic polymer in a flexible, elongated laminar form. The length of the laminar particles is substantially greater than their width and the width of the laminar particles is substantially greater than their thickness. In a preferred embodiment of the invention, a second particulate material in a rigid granular form is incorporated into the well servicing fluiud in admixture with the laminar particulate material.

In a further aspect of the present invention, there is provided a well servicing agent which comprises a blend of at least two particulate materials. One of the particulate materials comprises a thermoplastic polymer in a flexible, elongated laminar form and the other material comprises a thermoset polymer in a rigid granular form. The weight ratio of the laminar material to the granular material is at least 1:6. Preferably, the ratio of the laminar material to the granular material is at least 1:4 and, more preferably, the ratio of the laminar material to the granular material is within the range of 1:3–2:3.

In a further aspect of the invention there is provided a new and improved method of drilling a well to a subterranean location in the earth's crust by a drilling procedure in which a rotary drill bit is secured to the bottom of a drill string suspended in the well. A drilling mud is circulated through the well and fluid loss and loss of whole mud into a subterranean formation penetrated by the well is alleviated by incorporating a a blend of at least two particulate materials, as described above, into the drilling mud.

DESCRIPTION OF PREFERRED MODES

Depending upon the severity of the drilling fluid loss, the use of bridging agents in loss circulation remedial techniques may take one of two basic forms. In the first, normally applicable where only moderate mud loss is encountered, the loss circulation agent is added to the drilling mud while mud circulation is maintained as in the case of normal drilling operations. Circulation of the drilling mud containing the bridging agent is continued until the drilling mud returns indicate that the loss zone has been sealed. In the other procedure normally employed where substantial or complete loss circulation occurs, the circulation of drilling mud is terminated during the remedial action. In this case, where the loss circulation zone in the well can be identified, the end of the drill pipe, with or without the drill bit in place, is located adjacent to or slightly above the loss zone. A slug of drilling mud containing the loss circulation additive is then circulated down the drill pipe and into the loss zone. This may be carried out with or without a "casing head squeeze" in which the casing head annulus is closed in order to squeeze the suspension of bridging agents into the loss zone and deposit them as solids by loss of filtrate or whole mud. This second procedure is also employed where soft plugs or hard plugs are employed to effect a sealing of the loss zone. The loss circulation agents of the present invention may be employed in conjunction with either type of operation. That is, they may be added to the drilling mud as it is circulated through the well in the course of normal drilling operations, or they may be added in a discreet slug which is spotted at the loss circulation zone either with or without a casing head squeeze.

In accordance with one embodiment of the invention, there is provided a loss circulation agent which comprises a blend of two particulate materials. One or both of the materials may be derived by the processing of discarded wet-cell battery casings. The principal source of such battery casings is discarded automobile and truck batteries which are first processed to recover the lead therefrom. The spent casings are then processed through various grinding or milling techniques to recover products, principally polypropylene, which are then recycled for various industrial uses. The particulate materials employed in the present invention may be produced from remaining constituents of the battery casings.

The first particulate material employed in accordance with the present invention is a thermoplastic polymer in a flexible, elongated laminar form having the desirable properties of both fibers and flakes. While the size distribution of these elongated laminates varies from particle to particle, on average, their longitudinal length is substantially greater than the lateral dimension or width. The average width of the particles are, in turn, substantially greater than the average thicknesses. Most of the elongated laminates will range in length from about ½ to 1 inch, with an occasional particle ranging up to about 1½ inches long. A small percentage of the particles may have a length less than ½ inch. Most of the particles are about 1/16-¼ inch wide and are only a few mils in thickness, seldom exceeding a thickness of about 5 mils. While the elongated laminates are irregular in shape, the ratio of length to width for most particles will fall within the range of about 6-18. The ratio of the particle width to thickness will usually be somewhat greater and, on average, will be at lest 20-40.

The second of the particulate materials is a granular, thermoset plastic which has been ground into a granular form. This granular material may be derived from the processing of wet-cell batteries, as noted previously, in which the cases are formed of a hard rubber such as the phenol-formaldehyde resin available under the trade name Bakelite. As will be understood by those skilled in the art, hard, synthetic rubbers such as Bakelite are thermoset resins which have a cross-linked polymeric network and remain relatively hard under high temperature conditions. The thermoset polymers may be contrasted with the thermoplastic polymers which are linear or branch chain polymers and which are softened by the application of heat. The thermoset resin preferably is ground in a distribution across a relatively wide particle size range to provide a maximum density bed particle size distribution as described in greater detail hereinafter. The particulate granular material has a specific gravity within the range of 1.2-1.4.

The laminate material, like the granular material, may be derived from the processing of the exhausted casings of wet-cell batteries which have been processed to recover the lead therefrom. The laminate material may be composed of the class consisting of polypropylene, polyethylene, polyvinyl chloride, and mixtures thereof. Polypropylene is abundant in relatively modern wet cell batteries in which the casings are formed of polypropylene rather than the thermoset resins described previously. Polyethylene is also often times found in battery casings as is polyvinyl chloride. The latter in microporous form is sometimes used to form separators between the battery plates.

The particulate laminates function in conjunction with the granular material to form a seal at the formation face or, in the case in which loss circulation is due to relatively large fractures or fissures, within the formation itself. The dimensional relationships between the laminar material and the granular material are of particular significance in this regard. On average, the length of the laminar particles is substantially greater than the particle size of the granular material. For example, in even the coarsest blend, the granular material will seldom exceed a particle size of a more than one quarter inch and will exhibit an average particle size of perhaps 3/32 or slightly less. The laminar material will also exhibit a width which is greater than the size of at least a substantial portion of the granular material. In most cases, the average width of the laminar material will be greater than the particle sizes of a major portion of the granular material and except for very coarse blends of granular material, the average laminate width will be greater than a large preponderance of the granular particles.

The cooperative action between the laminar and granular materials may be described as follows with regard to the sealing of a verticle fracture or a fissure intersecting the wall of the well. The granular material in conjunction with the laminar material initially tends to plug the fracture and make an initial seal. The laminar material, as the granular material is deposited, tends to become wrapped around the granules so that the resulting particulate mixture is not subject to abrasion by fluid flow. The laminates also will tend to plaster out on the face of the particulate material, thus further aiding in the restriction of fluid flow from the well bore into the loss zone. As the resulting mass in which the laminates are wrapped around and disposed within the intersticies of the granular particles is formed, it becomes progressively more resistant to fluid pressure pulsations eminating into or out of the loss zone.

The interaction between the granular and laminar materials is well suited to a use of a particle size distribution to provide a maximum density bed of a type described by Gatlin et al "Some Affects of Size Distribution on Particle Bridging in Loss Circulation and Filtration Tests" Journal of Petroleum Technology, pages 575-578 (June 1961). Distributions of this type are based upon the principle that a bridge in the loss zone is initially formed by the largest or coarsest material. Following the formation of the initial bridge, the next smaller size particles plug the holes in the coarsest material and the next smaller size plugs the holes in the second size of granular material and so on until there is a complete and permanent seal formed. An ideal maximum density bed particle size distribution for coarse, medium and fine blends of granular material with the laminar material is illustrated in Table I.

In Table I, the first column indicates the mesh size and the successive columns indicate the product size distributions for coarse, medium and fine blends. In each pair of columns the first column indicates the cumulative distribution range and the second column indicates the incremental amount within each screen-size range. Each of the distributions is based upon the ideal maximum density distribution shown in the Gatlin et al article. The coarse, medium, or fine blend will be selected based upon the characteristics of the loss zone and the size of the jets in the drill bit. For example where the loss zone involves a relatively large vertically oriented fracture such that little or no mud returns are achieved, the coarse blend would initially be employed. It will be recognized that the particle size distributions given in table 1 are for the granular material only and not for the laminar material.

The blends illustrated in Table I are ideal and may be deviated from in practice. Preferably the blend used has substantial portions of particle sizes over a relatively wide distribution range of at least 10; that is, the largest particles are at least 10 times the size of the smallest particles in the blend. In addition, the mean particle size in the blend falls within the range of 25-45 cumulative percent when going from the larger to smaller sizes. Stated otherwise from 25-45 percent of the blend is larger than the mean particle size and the remainder is progressively smaller.

TABLE I

| US Mesh | Coarse Cum % | Coarse Incr % | Medium Cum % | Medium Incr % | Fine Cum % | Fine Incr % |
|---|---|---|---|---|---|---|
| On 4 | 5.0–0 | 5.0 | | | | |
| 4–8 | 33.0–5.0 | 28.0 | | 0 | | |
| 8–12 | 48.0–33.0 | 15.0 | 17.0–0 | 17.0 | | |
| 12–16 | 61.5–48.0 | 13.5 | 31.5–17.0 | 14.5 | 4.0–0 | 4 |
| 16–20 | 75.0–61.5 | 13.5 | 45.5–31.5 | 14.0 | 20.0–4.0 | 16.0 |
| 20–30 | 85.0–75.0 | 10.0 | 59.0–45.5 | 14.5 | 36.0–20.0 | 16.0 |
| 30–40 | 93.0–85.0 | 8.0 | 70.0–59.0 | 11.0 | 50.0–36.0 | 14.0 |
| 40–50 | 100.0–93.0 | 7.0 | 80.5–70.0 | 10.5 | 62.0–50.0 | 12.0 |
| 50–70 | | | 90.5–80.5 | 10.0 | 75.5–62.0 | 13.5 |
| 70–100 | | | 99.5–90.5 | 9.0 | 85.0–75.5 | 9.5 |
| 100–140 | | | | | 93.5–85.0 | 8.5 |
| 140–200 | | | | | 100.0–93.5 | 6.5 |
| TOTAL | 100.0 | | 100.5 | | 100.0 | |

In some cases, particularly where the loss circulation problem is not severe and it is not necessary to form a relatively strong mass or bed of bridging agent, the elongated laminar material may be employed by itself, without the presence of the granular material. In most cases, however, the laminar material and granular material will be employed in a blend as described previously, with the laminar material being present in a amount to provide a weight ratio of laminar material to granular material of at least 1:6. Depending upon the nature of the loss zone, it may sometimes be desirable to employ a ratio of laminar material to granular material of as high as 6:1. However, in most cases it will usually be advantageous to provide a slight excess of granular material and in a preferred enbodiment of the invention the ratio of laminar material to granular material is within the range of 1:3–2:3.

Both the granular thermoset polymer and the laminar thermoplastic polymer are mildly oleophillic and are readily dispersable in oil-base drilling fluids or other well servicing fluids. Both the granular material and the laminar material can be made hydrophillic by the addition of a small amount of a water-wetting surfactant and it is preferred to employ such a surfactant when the loss circulation agents are dispersed in an water-base fluid. By the term water-wetting surfactant as used herein is meant a surface active agent which has hydrophillic characteristics and which upon adsorbtion on the surfaces of the particulate materials will cause the surfaces to become preferentially water wettable, i.e., more readily wetted by water than by oil. Such a water wetting surfactant typically will form a monomolecular film in which an hydrophillic group such as a sulfonate, carboxylate or polyethylene oxide group is directed outwardly from the solid surface at the solid-water interface. Such water-wetting surfactants are old and well known to those skilled in the art and examples include the alkali metal or ammonium salts of petroleum or synthetic alkyl aryl sulfonates or intermediate to long chain organic acids, polyethoxylated alkyl phenols, and polyethoxylated aliphatic alcohols.

They need to be employed in only minor amounts. For example where a mixture of particulate and laminar material is to be incorporated into a water-base drilling mud in an amount of 20 pounds per barrel, the surfactant may be added in the amount of about 0.5 to 4 lbs. per barrel.

In certain circumstances it may be desirable to employ the granular agent alone in a well circulation fluid without the addition of the laminar agent. One application of this embodiment of the invention is in the use of the thermoplastic polymer in a finally ground form in a well completion or a workover fluid to form a filter cake and prevent matrix invasion of the fluid into a productive oil zone. The fluid may be either an oil-base or water-base medium. In this case, the thermoset polymer is ground to a fine particle size of about 100 mesh or less and dispersed in the well completion or work over fluid. The fine particles form a filter cake in or on the formation face, thus retarding matrix invasion by the fluid. At the same time, when the well is placed on production subsequent to the completion or work-over procedure, the filter cake is either already oil wet or, because of its basic oleophillic characteristics, gradually becomes oil wet. In either case, it then is readily removed by the hydrocarbon fluid flowing into the well. The finely ground particles of thermoset polymer may be added to the completion fluid in any suitable amount as is necessary to form an adequate filter cake. Typically, the granular material will be added in an amount of 2–15 lbs. per barrel, with 6–10 lbs/barrel being preferred.

A further application of the thermoset granular material when ground to an average particle size of about 100 mesh or less is as a hole lubricant to reduce the friction encountered by a rotating drilling string within the well. In the normal course of drilling, the drill pipe is rotated against the wall of the well with an attendant increase in friction which results in the loss of torque imparted to the bit. When the thermoset polymer is ground to an average mesh size about 100 or less it tends to assume a spheriodal configuration which provides good lubricating characteristics. Where the finely ground material is employed in a water-base mud, it is preferred to first wet the particles with a light oil such as diesel oil before dispersing it in the mud.

The loss circulation blend may also contain other materials which function as and are commonly used as bridging agents. These include cellulose fibers and flakes (wood fibers and shavings) and cellophane flakes. Cellophane may also be cut or shredded to provide elongated laminar particles as described previously.

As noted previously, the elongated laminates may be used alone, especially in those situations in which the mud loss is not severe. The elongated laminar material may be employed in this regard in servicing fluids such as completion and workover fluids as well as in drilling muds. Where the laminar material is used as the sole bridging agent, it normally should be employed in an amount of at lest 5–15 lbs./barrel. The laminar material may also be employed in combination with other granular materials such as ground black walnut hulls, ground coal, ground fruit pits, and gilsonite.

As noted in the aforementioned book by Messenger at pages 97–99, loss circulation is sometimes encountered in the course of cementing a casing string within the well. In this respect, it is a conventional practice to set casing in the well. This usually occurs in several steps during the drilling program or on other more rare occasions, only at the conclusion of the drilling program. In either case, the casing is run into the well and cement is then circulated through the casing, out through an opening as provided by a cement shoe or other well tool, and then upwardly through the annulus between the casing and the wall of the well. Where loss circulation occurs during the cementing operation, it is a conventional practice to treat the cement slurry with loss circulation agents which, as noted by Messenger, seal the loss zone and also act as lighteners for the slurry. The well servicing additives of the present invention may be employed as loss circulation agents during such cementing operations. The elongated laminar agent may be applied to the cement alone or in admixture with a granular particulate material as described previously. In cementing operations, the agent should be incorporated into the slurry in an amount of about 5-10 lbs. per 94 pound sack of cement. Because of the high pH of cement slurry (12.5), no water wetting surfactant usually is required.

A further application of the present invention is in the hydraulic fracturing of a subterranean formation. As is well known to those skilled in the art, hydraulic fracturing is accomplished by disposing a suitable fracturing fluid within the well opposite the formation to be fractured. Thereafter sufficient pressure is applied to the fracturing fluid to cause formation breakdown with the resulting production of one or more fractures therein. In many cases the fracture or fractures induced in the formation will tend to be oriented in a verticle direction. This is particularly true in formations at depths of about 3,000 feet or more in which the so called "over burden pressure" exceeds the horizontal stress characteristics of the formation.

In hydraulic fractoring operations it is a conventional expedient to add a propping agent to the fracturing fluid in order to hold the walls of the fracture apart. In accordance with the present invention, the granular thermoset polymeric material is employed as a propping agent for this purpose. The granular material because of its relatively low density. i. e. about 1.2–1.4 as noted previously, will be transported through the fracture along a substantial verticle section thereof instead of settling rapidly to the bottom. The granular material may be of any suitable size commonly used in conventional hydrualic fracturing operations. However, because of its relatively low density, it may be employed in a somewhat larger size range than that commonly called for with sand proping agent. Thus granular material may have an average size of about 8-12, mesh.

Having described specific embodiments of the present invention, it will be understood tha certain modifications thereof may be suggested to those skilled in the art and it is intended to cover all such modifications as fall within the scope of the appended claims.

What is claimed is:

1. In the servicing of a well penetrating a subterranean formation in the earth's crust wherein a well servicing liquid is circulated into said well in contact with said formation, the improvement comprising incorporating within said servicing liquid a particulate material formed of a thermoplastic polymer in a flexible, elongated, laminar form in which the length of the laminar particles is substantially greater than their width to provide a ratio of length to width of at least 6 and the width of said laminar particles is substantially greater than their thickness to provide a ratio of width to thickness of at least 20.

2. The method of claim 1 further comprising incorporating into said well servicing liquid in admixture with said laminar particulate material, a second particulate material in a rigid granular form.

3. method of claim 2 wherein the ratio of said laminar material to said granular material is at least 1:6.

4. The method of claim 2 wherein the ratio of said laminar material to said granular material is at least 1:4.

5. The method of claim 2 wherein the ratio of said laminar material to said granular material is within the range of 1:3–2:3.

6. The method of claim 2 wherein the major dimensions of said laminar particles are substantially greater than the average size of said granular particles.

7. The method of claim 6 wherein said particulate material is incorporated into said well servicing liquid in an amount of at least 2 pounds per barrel.

8. In a well servicing agent, the composition of matter comprising a blend of at least two particulate materials, one of said particulate materials comprising a thermoset polymer in a rigid granular form and another of said particulate materials comprising a thermoplastic polymer in a flexible, elongated laminar form, the weight ratio of said laminar material to said granular material being at least 1:6 and said laminar material having an average thickness not exceeding 5 mils.

9. The composition of claim 8 wherein the ratio of said laminar material to said granular material is within the range of 1:6 to 6:1.

10. The composition of claim 8 wherein the ratio of said laminar material to said granular material is at least 1:4.

11. The composition of claim 3 wherein the ratio of said laminar material to said granular material is within the range of 1:3–2:3.

12. The composition of claim 8 wherein the major dimensions of said laminar particles are substantially greater than the average size of said granular particles.

13. In the drilling of a well to a subterranean location in the earth's crust with a rotary drill bit secured to the bottom of a drill string suspended in said well and wherein a drilling mud is circulated through said well, the method of alleviating drilling mud loss into a subterranean formation penetrated by said well comprising incorporating into said drilling mud a circulation loss agent comprising a blend of at least two particular materials, one of said particulate materials comprising a thermoset polymer in a rigid granular form and another of said particulate materials comprising a thermoplastic polymer in a flexible, elongated laminar form, the weight ratio of said laminar material to said granular material being at least 1:6 and said laminar material having an average thickness not exceeding 5 mils.

14. The method of claim 13 wherein said drilling mud is a water-base mud and further comprising incorporating a water wetting surfactant in said mud to render said particulate materials hydrophillic.

15. The method of claim 1 wherein said laminar particles have an average thickness not exceeding 5 mils.

* * * * *